United States Patent [19]
Rosso

[11] Patent Number: 5,829,388
[45] Date of Patent: Nov. 3, 1998

[54] PET CONTAINMENT ASSEMBLY

[76] Inventor: Gary Rosso, 16735 Cerro Vista Dr., Morgan Hill, Calif. 95037

[21] Appl. No.: 890,270

[22] Filed: Jul. 9, 1997

[51] Int. Cl.$^6$ ................................................ A01K 29/00
[52] U.S. Cl. ............................ 119/416; 119/453; 160/105
[58] Field of Search ................................. 119/416, 512, 119/513, 453, 522, 523; 160/105

[56] References Cited

U.S. PATENT DOCUMENTS

| | | | |
|---|---|---|---|
| 2,665,627 | 1/1954 | Fager | 98/99.8 |
| 3,107,649 | 10/1963 | Blend, Jr. | 119/453 X |
| 4,343,263 | 8/1982 | Glöggler | 119/523 |
| 4,653,562 | 3/1987 | Moss et al. | 160/105 |
| 4,854,364 | 8/1989 | Junker | 160/105 |
| 4,870,925 | 10/1989 | Troutman | 119/453 |
| 4,913,212 | 4/1990 | Clavier | 160/107 |

FOREIGN PATENT DOCUMENTS 231414  12/1959  Australia ................................ 119/416

*Primary Examiner*—Robert P. Swiatek
*Attorney, Agent, or Firm*—Joseph N. Breaux

[57] ABSTRACT

A pet containment assembly for containing pets within a closed automobile while allowing air to circulate freely through the windows of the automobile to provide a safe and comfortable environment for the pets, the assembly having a two-piece adjustable frame which has both stationary horizontal bars and telescoping horizontal bars so that the frame can be extended to the full width of a window opening in the automobile, the frame being held in place in the opening by tabs on the frame which fit into the grove of the window opening and a groove in the frame into which the top edge of the window fits, thereby securing the frame in the opening.

18 Claims, 4 Drawing Sheets

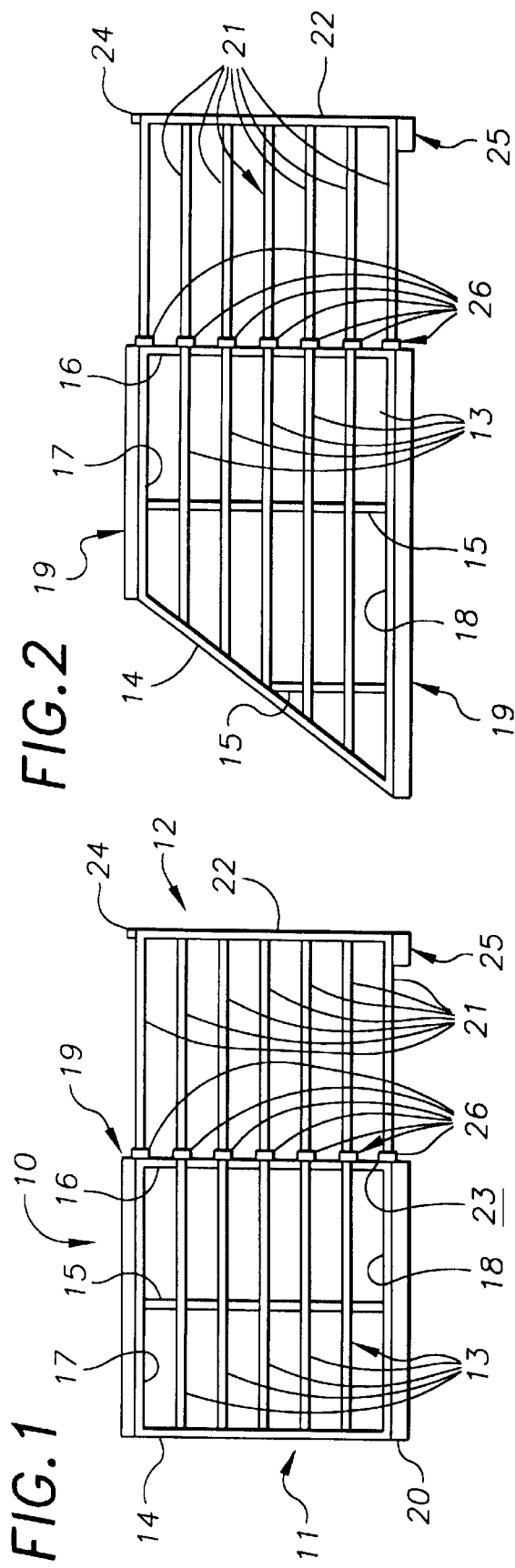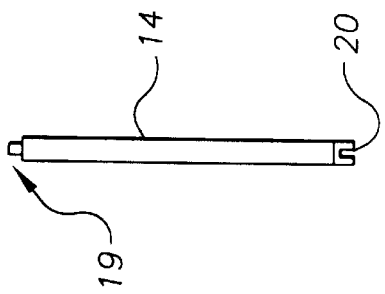

PET CONTAINMENT ASSEMBLY

TECHNICAL FIELD

The present invention relates to devices and methods for containing pets within a closed automobile while allowing air to circulate freely through the windows of the automobile to provide a safe and comfortable environment for the pets and more particularly to devices and methods for containing pets within an automobile using an adjustable frame which has horizontally telescoping bars so that the frame can be extended to the full width of a window opening in the automobile, the frame being held in place in the opening by tabs on the frame which fit into the groove of the window opening and a groove in the frame into which the lowered window fits, thereby securing the frame in the opening.

BACKGROUND OF THE INVENTION

Many people who have pets enjoy traveling with those pets on both short and long trips. Although the people and pets enjoy each other's company during these trips, it is often necessary for the pet owner to leave a pet unattended in an automobile or recreational vehicle for a period of time. For example, pets may be taken on trips to a grocery store or to run other errands and must be left in the automobile while their owners shop. Pets may also be taken on family vacations and left in a recreational vehicle or automobile for extended periods while the family visits tourist attractions. Every year, many pets suffer discomfort, injury and sometimes even death as a result of being Left in an automobile or recreational vehicle which has closed windows and which therefore has little or no ventilation to cool the interior of the automobile.

Although the windows of the automobile may be lowered slightly to allow some air to circulate through the automobile, the pet owners may not lower the windows enough to provide adequate ventilation because a larger window opening may allow the pets to escape from the automobile or may allow thieves to gain entry to the automobile through the window opening. If the automobile windows are not lowered sufficiently, the pets in the automobile may be confined in temperatures which reach well over 100 degrees Fahrenheit, thereby causing at least discomfort and at most death.

SUMMARY OF THE INVENTION

It is thus an object of the invention to provide a pet containment assembly.

It is a further object of the invention to provide a pet containment assembly that fits within the opening of an automobile window frame.

It is a still further object of the invention to provide a pet containment assembly that adjusts in size to fit the width of an automobile window opening.

It is a still further object of the invention to provide a pet containment assembly that can be secured within an automobile window opening.

It is a still further object of the invention to provide a pet containment assembly that includes a two-piece frame which has a plurality of telescoping horizontal bars connected by a plurality of vertical supports, tabs on the upper edge of the frame for engagement with the grooved upper window molding of an automobile door frame and grooves on the lower edge of the frame for engagement with the upper edge of the automobile window.

It is a still further object of the invention to provide a pet containment assembly that accomplishes some or all of the above objects in combination.

Accordingly, a pet containment assembly meeting the above objects is provided.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a plan view of the preferred embodiment of the pet containment assembly of the present invention.

FIG. 2 is a plan view of an alternate embodiment of the pet containment assembly of the present invention.

FIG. 3 is an end view of the preferred embodiment of the pet containment assembly of the present invention.

DESCRIPTION OF THE EXEMPLARY EMBODIMENT

Figure 5:
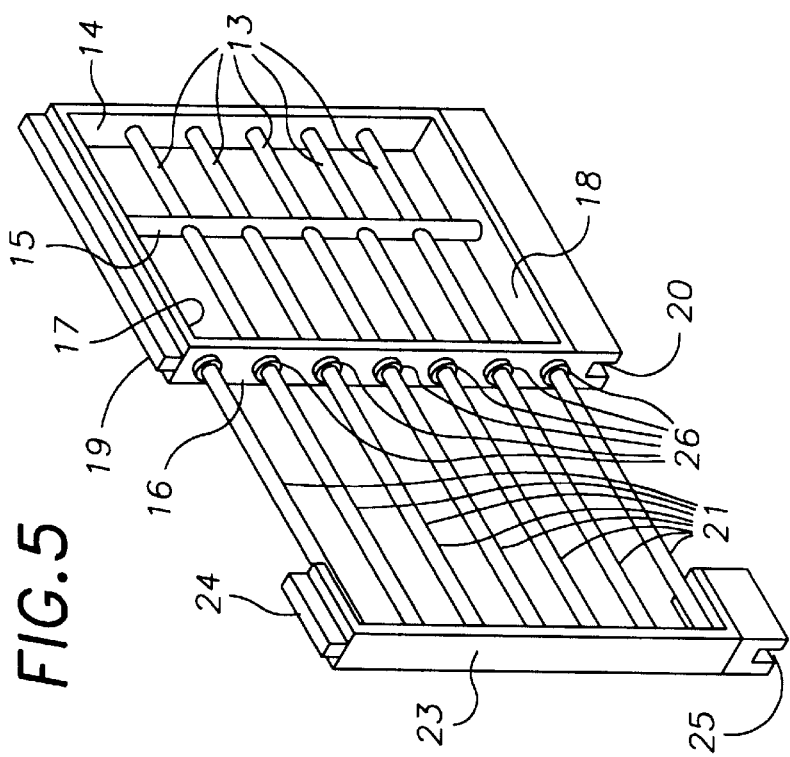
FIG. 5 is a perspective view of the preferred embodiment of the pet containment assembly of the present invention.

Referring to FIG. 1, a plan view of the preferred embodiment of the invention, generally designated by the numeral 10, is shown. The preferred embodiment 10 comprises a generally planar, rectangular frame which has a main frame portion generally designated by the numeral 11 and a telescoping frame portion generally designated by the numeral 12. The main frame portion 11 has a plurality of horizontal bars 13 which are rigidly connected by a vertical end support 14, a vertical central support 15, and a vertical connecting support 16. The main frame portion 11 also has an upper horizontal bar 17 and a lower horizontal bar 18.

The main frame portion 11 has a tab 19 connected to the Lop of upper horizontal bar 17. Tab 19 extends upward and is sized to fit within the grooved window molding at the top of an automobile door frame. Main frame portion 11 has a groove 20 at its lower edge in lower horizontal bar 18. Groove 20 opens downward so that the top edge of a lowered automobile window can fit within the groove.

Horizontal bars 13 comprise tubes and vertical connecting support 16 has a plurality of apertures 23 which extend through the vertical connecting support and which are coaxial with horizontal bars 13, upper horizontal bar 17 and lower horizontal bar 18 so that a bore is defined through the vertical connecting support and into each of the horizontal bars. The bore through each of the horizontal bars also extends through vertical central support 15.

Telescoping frame portion 12 has a plurality of horizontal bars 21 which are rigidly connected to vertical end support 22. Each of the horizontal bars 21 is connected to the vertical end support 22 at a height corresponding to one of the horizontal bars 13, upper horizontal bar 17 or lower horizontal bar 18 of the main frame portion. Each of the horizontal bars 21 is aligned so that it is coaxial with the bore extending into the corresponding horizontal bar. Each of the horizontal bars 21 is sized to fit within the corresponding bore in horizontal bar 13, 17 or 18. An upwardly extending tab 24 is connected to telescoping frame portion 12 at the top of vertical end support 22. Tab 24 is sized to fit within the grooved window molding at the top of an automobile door frame. A downwardly extending groove 25 sized so that the top edge of a lowered automobile window can fit therewithin is located at the lower end of vertical end support 22.

The telescoping frame portion 12 is slidingly connected to the main frame portion 11 by inserting the horizontal bars 21 into the bores in horizontal bars 13, 17 and 18. Telescoping frame portion 12 can thereby be moved with respect to main frame portion 11 so that the distance between vertical end support 14 and vertical end support 22 is adjustable to fit the width of many different automobile window openings. Spacers 26 are connected to the vertical connecting support 16 at the apertures 23 and are coaxial with the apertures. The spacers maintain a gap between vertical end support 22 and vertical connecting support 16 so that the end support is more easily gripped and extended from the main frame portion.

The invention can be manufactured in a variety of ways from a variety of materials. For example, metals such as anodized aluminum may be extruded to form the bars, supports and other parts of the invention. These parts can then be assembled and held together by mechanical means or by welding. Plastics, such as nylon, ABS plastic, styrene or polyethylene, may also be extruded to form the bars and supports and other parts which are then assembled to form the invention. Metals and plastics may also be used in combination to form the invention. An example of such a combination of materials would be the use of metal for the bars and supports, while parts such as the tabs and grooved portions of the frame might be made of plastics to minimize the possibility that metal parts could scratch the automobile.

Components of the invention which are made of plastics such as ABS plastic can be injection molded as well as extruded. This may present a more cost effective option for the manufacture of larger pieces of the invention. For example, the entire telescoping frame portion could be injection molded as a single piece.

Metal components of the invention can be manufactured using metal stamping and punching processes rather than extrusion. Again, this may present a cost effective alternative to extrusion because larger pieces of the invention such as the telescoping frame portion could be manufactured as a single piece. Regardless of the metal forming process, metals such as aluminum will benefit from the anodization of the component surfaces. This process will form a thin, protective layer of oxidation on the component surfaces which will protect them from corrosion due to weather conditions.

The foregoing is a description of the preferred embodiment of the invention. There are numerous variations which can be made to the invention, some of which are described in the following paragraphs.

The embodiment described above is generally rectangular in shape. The invention may also use a vertical end support 14 or 22 which is disposed at an angle which is not perpendicular to the horizontal bars 13, 17, 18 and 21. This embodiment is shown in FIG. 2. The vertical end support (14 in FIG. 2) is angled so that the lower edge of the invention extends further than the upper edge of the invention. The angle conforms more closely to the angled side edge of a window opening so that the gap between the vertical end support and the edge of the window opening is minimized. Both of the vertical end supports may be angled in this manner.

The preferred embodiment uses three vertical supports 14, 15 and 16 in the main frame portion. The number of vertical supports can be varied if desired. For example, if greater rigidity or strength is desired, additional vertical supports can be included in the design. On the other hand, if the materials used in the invention are sufficiently strong, the main frame portion may only require a vertical end support 14 and vertical connecting support 16.

Figure 4:
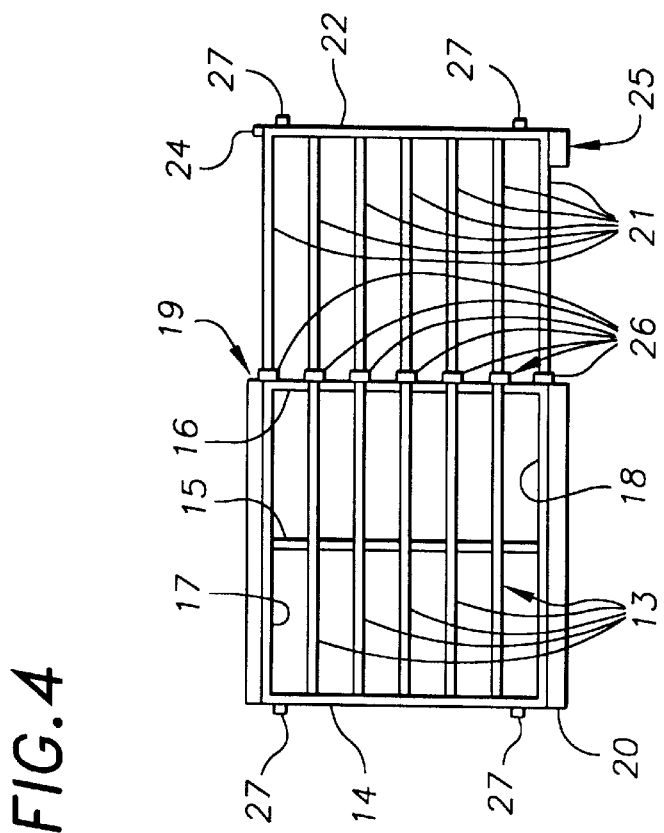
FIG. 4 is a plan view of an alternate embodiment of the pet containment assembly of the present invention.
Figure 6A:
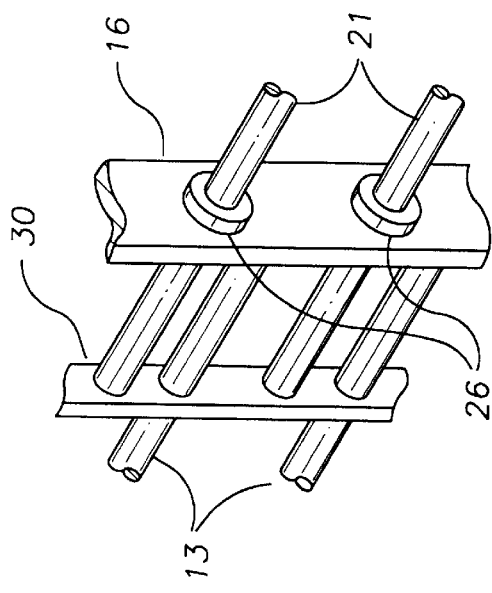
FIG. 6a is a detail view of the telescoping bars of the preferred embodiment of the pet containment assembly of the present invention.

The preferred embodiment uses a single tab at the top edge of the main frame portion and a single tab at the top of the vertical end support of the telescoping frame portion. The number of tabs may be increased if desired, although the placement of tabs on the uppermost horizontal bar of the telescoping frame portion may restrict the sliding movement of the telescoping frame portion. The same is true of the grooves on the lower edge of the main frame portion and at the bottom of the vertical end support of the telescoping frame portion. Referring to FIG. 4, tabs 27 which extend outward from the sides of the invention can also be added to the vertical end supports of both the main frame portion and the telescoping frame portion. These tabs would be placed to engage the grooved window moldings at the sides of the window opening so that the invention would be more secure in its contact with the sides of the window frame.

Figure 10:
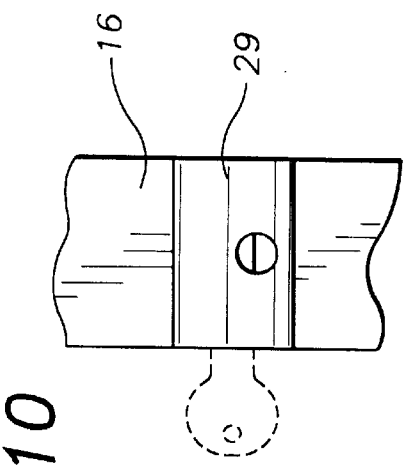
FIG. 10 is a side view of the locking mechanism of an alternate embodiment of the pet containment assembly of the present invention.
Figure 9:
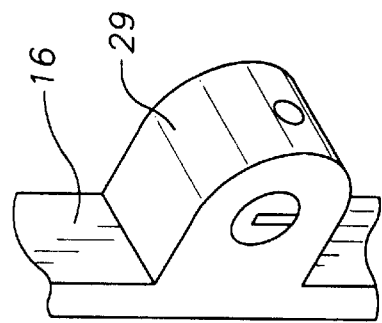
FIG. 9 is a perspective view of the locking mechanism of an alternate embodiment of the pet containment assembly of the present invention.
Figure 11:
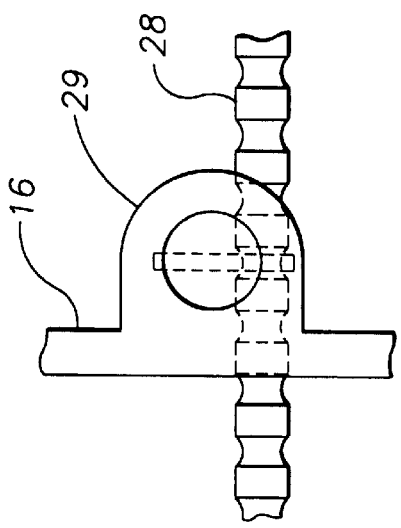
FIG. 11 is a plan view of the locking mechanism of an alternate embodiment of the pet containment assembly of the present invention.

If the invention is intended not only to provide means for keeping a pet within an automobile, but also to provide protection from persons who may attempt to gain entry into the automobile, locking means can be provided to prevent the telescoping frame portion from being retracted into the main frame portion. One example of such a locking mechanism, shown in FIGS. 9, 10 and 11, would be a cylinder lock 29 connected to the vertical connecting support 16 which prevents movement of one the telescoping horizontal bars which is circumferentially grooved 28 from moving with respect to the vertical connecting support 16. When the cylinder lock is in its unlocked position, the horizontal bar and hence the telescoping frame portion are free to move.

Figure 6B:
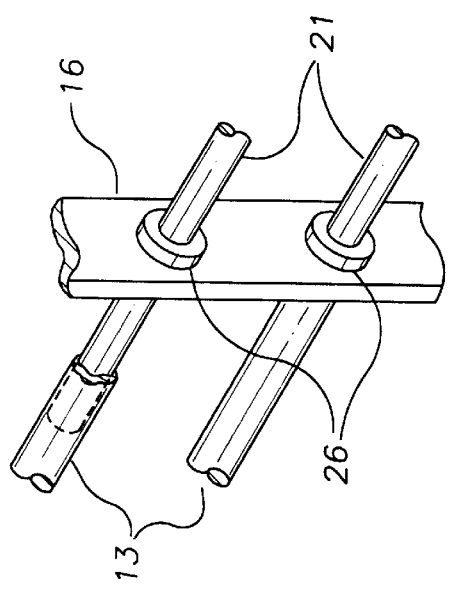
FIG. 6b is a detail view of the telescoping bars of an alternate embodiment of the pet containment assembly of the present invention.

An alternate embodiment of the invention has solid horizontal bars rather than the tubular bars of the preferred embodiment. The telescopic movement of the two frame portions is achieved by placing the apertures of the vertical connecting support 16 to positions above or below the horizontal bars 13 of the main frame portion as shown in FIG. 6b. Then, when the telescoping horizontal bars 21 of the telescoping frame portion are inserted through the apertures, the horizontal bars of the telescoping frame portion are on the same plane as the of the main frame portion, but they are not coaxial as in the preferred embodiment. A vertical retaining support 30 can be connected to the ends of the horizontal bars of the telescoping frame portion to make the assembly more rigid, but this is not required.

Figure 7:
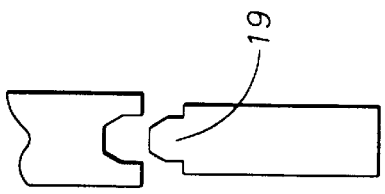
FIG. 7 is a detail view of the lower grooved portion of an exemplary embodiment of the pet containment assembly of the present invention in an installed position against the upper edge of a lowered automobile window.
Figure 8:
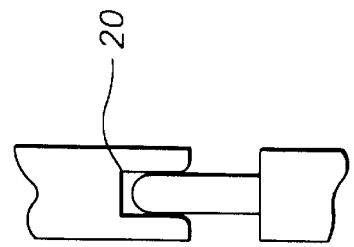
FIG. 8 is a detail view of the upper tabbed portion of an exemplary embodiment of the pet containment assembly of the present invention in an installed position against the groove of the grooved window molding in the upper portion of an automobile door frame.
Figure 12:
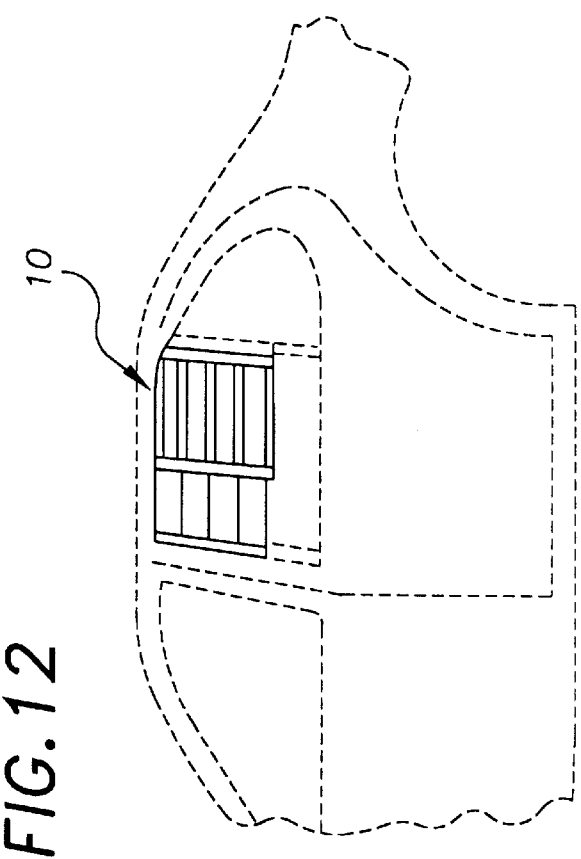
FIG. 12 is a view of the pet containment assembly of the present invention installed in an automobile window opening.

Referring to FIGS. 7, 8 and 12, the invention is installed in an automobile by lowering one of the windows so that the distance between the top edge of the window and the grooved window molding in the door frame is greater than the height of the invention from horizontal bar 17 to horizontal bar 18. Grooves 20 and 25 are aligned with the top edge of the window and tabs 19 and 24 are aligned with the window groove and telescoping frame portion 12 is extended from main frame portion 11 so that vertical end supports 14 and 22 contact the sides of the window opening. The window is raised so that the top edge of the window engages grooves 20 and 25 and tabs 19 and 24 engage the grooved window molding at the top of the door frame. The invention is thereby secured in position in the window opening so that the opening is blocked by the horizontal bars and vertical supports to prevent pets from escaping through the opening, yet air is allowed to freely circulate through the bars so that the automobile is well ventilated. In order to remove the invention, the window is simply lowered, the invention taken out of the window opening, and the telescoping frame portion slid into the main frame portion so that the invention is in its most compact position for storage.

It can be seen from the preceding description that a method and device for containing pets within a closed automobile while allowing air to circulate freely through the windows of the automobile to provide a safe and comfortable environment for the pets which fits within the opening of an automobile window frame, adjusts in size to fit the width of an automobile window opening, can be secured within an automobile window opening and includes a two-piece frame which has a plurality of telescoping horizontal bars connected by a plurality of vertical supports, tabs on the upper edge of the frame for engagement with the upper window molding of an automobile door frame and grooves on the lower edge of the frame for engagement with the upper edge of the automobile window has been provided.

It is noted that the embodiment of the pet containment assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A pet containment assembly comprising:
    a two-part frame assembly having a main frame portion and a telescoping frame portion which is slidingly connected to said main frame portion,
    said main frame portion having a plurality of horizontal tubular bars, each of said horizontal tubular bars being evenly spaced from the adjacent one of said horizontal tubular bars and being rigidly connected at a first end to a first vertical end support, each of said horizontal tubular bars being rigidly connected at a second end to a vertical connecting support, said vertical connecting support having a plurality of apertures extending horizontally therethrough, each of said apertures being coaxial with one of said horizontal tubular bars, said main frame portion having a lowermost horizontal tubular bar which has a downwardly facing groove for engagement with an automobile window, said main frame portion also having an uppermost horizontal tubular bar which has an upwardly extending tab for engagement with an automobile window molding;
    said telescoping frame portion having a plurality of horizontal telescoping bars, each of said horizontal telescoping bars having a first end which is rigidly connected to a second vertical end support, said horizontal telescoping bars being aligned coaxially with said horizontal tubular bars, each of said horizontal telescoping bars having a second end which is slidingly disposed within one of said horizontal tubular bars, said second vertical end support having a downwardly facing groove for engagement with an automobile window and an upwardly extending tab for engagement with an automobile window molding.

2. The pet containment assembly of claim 1, further comprising: a lock connected to said vertical connecting support and having an locked position in which said lock engages a lockable one of said horizontal telescoping bars and thereby prevents movement of said engaged horizontal telescoping bar toward said vertical connecting support, said lock having a second position in which said lock is disengaged from said lockable horizontal telescoping bar so that said lockable horizontal telescoping bar can move toward said vertical connecting support.

3. The pet containment assembly of claim 2, further comprising: one or more secondary tabs connected to said first and second vertical end supports, said one or more secondary tabs extending outwardly for engagement with an automobile window molding.

4. The pet containment assembly of claim 1 further comprising: one or more secondary tabs connected to said first and second vertical end supports, said one or more secondary tabs extending outwardly for engagement with an automobile window molding.

5. The pet containment assembly of claim 1 wherein: said main frame portion further comprises a vertical central support, said vertical central support being disposed between said first vertical end support and said vertical connecting support and being rigidly connected to said horizontal tubular bars so that the spacing between said horizontal tubular bars is maintained.

6. The pet containment assembly of claim 5, further comprising: a lock connected to said vertical connecting support and having an locked position in which said lock engages a lockable one of said horizontal telescoping bars and thereby prevents movement of said engaged horizontal telescoping bar toward said vertical connecting support, said lock having a second position in which said lock is disengaged from said lockable horizontal telescoping bar so that said lockable horizontal telescoping bar can move toward said vertical connecting support.

7. The pet containment assembly of claim 6, further comprising: one or more secondary tabs connected to said first and second vertical end supports, said one or more secondary tabs extending outwardly for engagement with an automobile window molding.

8. The pet containment assembly of claim 1 wherein: at least one of said vertical end supports is disposed to form an angle with said lowermost horizontal tubular bar, said angle being less than 90 degrees.

9. The pet containment assembly of claim 1 wherein: said main frame portion further comprises a plurality of spacers connected to said vertical connecting support opposite said horizontal tubular bars.

10. The pet containment assembly of claim 9 wherein: said main frame portion further comprises a vertical central support, said vertical central support being disposed between said first vertical end support and said vertical connecting support and being rigidly connected to said horizontal tubular bars so that the spacing between said horizontal tubular bars is maintained.

11. The pet containment assembly of claim 10, further comprising: a lock connected to said vertical connecting support and having an locked position in which said lock engages a lockable one of said horizontal telescoping bars and thereby prevents movement of said engaged horizontal telescoping bar toward said vertical connecting support, said lock having a second position in which said lock is disengaged from said lockable horizontal telescoping bar so that said lockable horizontal telescoping bar can move toward said vertical connecting support.

12. The pet containment assembly of claim 11, further comprising: one or more secondary tabs connected to said first and second vertical end supports, said one or more secondary tabs extending outwardly for engagement with an automobile window molding.

13. A pet containment assembly comprising:
   a two-part frame assembly having a main frame portion and a telescoping frame portion which is slidingly connected to said main frame portion,
   said main frame portion having a plurality of primary horizontal bars, each of said primary horizontal bars being evenly spaced from the adjacent one of said primary horizontal bars and being rigidly connected at a first end to a first vertical end support, each of said primary horizontal bars being rigidly connected at a second end to a vertical connecting support, said vertical connecting support having a plurality of apertures, each said aperture extending horizontally through said vertical connecting support and having an axis therethrough which is parallel to said primary horizontal bars, said main frame portion having a lowermost primary horizontal bar which has a downwardly facing groove for engagement with an automobile window, said main frame portion also having an uppermost primary horizontal bar which has an upwardly extending tab for engagement with an automobile window molding;
   said telescoping frame portion having a plurality of horizontal telescoping bars, each of said horizontal telescoping bars having a first end which is rigidly connected to a second vertical end support, said horizontal telescoping bars being aligned with said apertures in said vertical connecting support, each of said horizontal telescoping bars being slidingly disposed within one of said apertures, said second vertical end support having a downwardly facing groove for engagement with an automobile window and an upwardly extending tab for engagement with an automobile window molding.

14. The pet containment assembly of claim 13 wherein: said primary horizontal bars rigidly connected to said main frame portion are tubular,
   each of said apertures in said vertical connecting support is coaxial with one of said primary horizontal bars, and said horizontal telescoping bars are aligned coaxially with said primary horizontal bars, each of said horizontal telescoping bars having a second end which is slidingly disposed within one of said tubular primary horizontal bars.

15. The pet containment assembly of claim 14 wherein: said main frame portion further comprises
   a plurality of spacers connected to said vertical connecting support opposite said horizontal tubular bars,
   a lock connected to said vertical connecting support and having an locked position in which said lock engages a lockable one of said horizontal telescoping bars and thereby prevents movement of said engaged horizontal telescoping bar toward said vertical connecting support, said lock having a second position in which said lock is disengaged from said lockable horizontal telescoping bar so that said lockable horizontal telescoping bar can move toward said vertical connecting support, and
   one or more secondary tabs connected to said first and second vertical end supports, said one or more secondary tabs extending outwardly for engagement with an automobile window molding.

16. The pet containment assembly of claim 13, wherein: each of said apertures in said vertical connecting support is offset from said primary horizontal bars so that said horizontal telescoping bars disposed within said apertures are parallel to but not coaxial with said primary horizontal bars and said horizontal telescoping bars can slide through said apertures into a retracted position in which said horizontal telescoping bars are disposed between said primary horizontal bars.

17. The pet containment assembly of claim 16, wherein: said telescoping frame portion further comprises a vertical retaining support which has a plurality of apertures therethrough, said vertical retaining support being disposed between said vertical connecting support and said first vertical end support of said main frame portion and having one of said primary horizontal bars slidingly disposed within each of said retaining support apertures, each of said horizontal telescoping bars having a second end which is rigidly connected to said vertical retaining support.

18. The pet containment assembly of claim 17, wherein: said main frame portion further comprises
   a plurality of spacers connected to said vertical connecting support opposite said horizontal tubular bars,
   a lock connected to said vertical connecting support and having an locked position in which said lock engages a lockable one of said horizontal telescoping bars and thereby prevents movement of said engaged horizontal telescoping bar toward said vertical connecting support, said lock having a second position in which said lock is disengaged from said lockable horizontal telescoping bar so that said lockable horizontal telescoping bar can move toward said vertical connecting support, and
   one or more secondary tabs connected to said first and second vertical end supports, said one or more secondary tabs extending outwardly for engagement with an automobile window molding.

* * * * *